(12) United States Patent
Grund et al.

(10) Patent No.: US 6,994,912 B2
(45) Date of Patent: *Feb. 7, 2006

(54) CO-EXTRUDED, MULTI-LAYERED, BIAXIALLY ORIENTED, WELDABLE FLAT FILM FOR THE PRODUCTION OF WELDED TUBULAR FILMS AND USE THEREOF

(75) Inventors: Hartmut Grund, Otterstadt (DE); Horst Lang, Weinheim (DE); Helmut Schauer, Mannheim (DE)

(73) Assignee: Naturin GmbH & Co., Weinheim (DE)

( * ) Notice: Subject to any disclaimer, the term of this patent is extended or adjusted under 35 U.S.C. 154(b) by 62 days.

This patent is subject to a terminal disclaimer.

(21) Appl. No.: 10/470,904

(22) PCT Filed: Feb. 1, 2001

(86) PCT No.: PCT/EP01/01064

§ 371 (c)(1),
(2), (4) Date: Aug. 1, 2003

(87) PCT Pub. No.: WO02/060991

PCT Pub. Date: Aug. 8, 2002

(65) Prior Publication Data

US 2004/0067381 A1 Apr. 8, 2004

(51) Int. Cl.
*B32B 27/34* (2006.01)
*B32B 1/08* (2006.01)
*B29C 55/00* (2006.01)

(52) U.S. Cl. .................. 428/474.4; 428/34.1; 428/34.3; 428/34.6; 428/34.7; 428/36.9; 428/36.91; 428/213; 428/411.1

(58) Field of Classification Search .............. 428/474.4, 428/34.1, 34.3, 35.6, 34.7, 36.9, 36.91, 411.1, 428/34.9

See application file for complete search history.

(56) References Cited

U.S. PATENT DOCUMENTS

| | | | | |
|---|---|---|---|---|
| 648,532 A | * | 5/1900 | Yap et al. | ................... 278/117 |
| 4,726,984 A | | 2/1988 | Shah | |
| 5,626,944 A | | 5/1997 | Rasmussen | |
| 5,759,648 A | | 6/1998 | Idlas | |

FOREIGN PATENT DOCUMENTS

| | | |
|---|---|---|
| EP | 0 358 038 | 3/1990 |
| EP | 0 620 244 | 10/1994 |
| EP | 0 685 510 | 12/1995 |
| EP | 0 962 145 | 12/1999 |
| RU | 2106973 C1 | 3/1998 |
| RU | 2138399 C1 | 9/1999 |

* cited by examiner

*Primary Examiner*—P. Hampton Hightower
(74) *Attorney, Agent, or Firm*—Oblon, Spivak, McClelland, Maier & Neustadt, P.C.

(57) ABSTRACT

The invention relates to a coextruded, multilayered, biaxially oriented and weldable flat film for the production of welded tubular films and to the use thereof for wrapping and packaging foodstuffs. The inventive flat film has two weldable surface layers made of at least one copolyamide and at least one amorphous polyamide and/or at least one homopolyamide and/or at least one modified polyolefin.

30 Claims, No Drawings

CO-EXTRUDED, MULTI-LAYERED, BIAXIALLY ORIENTED, WELDABLE FLAT FILM FOR THE PRODUCTION OF WELDED TUBULAR FILMS AND USE THEREOF

BACKGROUND OF THE INVENTION

1. Field of the Invention

The invention relates to a coextruded, multilayered, biaxially oriented, weldable flat film used to produce tubular films by welding in a well-known manner, which tubular films are used for the packaging and wrapping of foodstuffs, particularly pasty foodstuffs.

2. Description of the Background

Multilayered, biaxially oriented flat films produced either by coextruding a tubular film and cutting open the tube, or by direct coextrusion of a flat film are well-known. Using welding for packaging purposes, all kinds of tubular films can be produced from such multilayered flat films in a well-known fashion by bending the flat film to form a tube and joining the contacting opposite edges by a seal strip extending in longitudinal direction. A second way would be bending the flat film to form a tube by allowing overlap of the opposite edges and welding together the overlapping areas. A third way of forming a tubular film from a flat film is bending the flat film to form a tubular film and welding together the respective opposite edge areas along the length thereof, thereby forming a longitudinal fold where equal sides of the flat film make contact with each other.

In addition to high impermeability to water vapor and oxygen, such films must meet high demands with respect to weldability and, in particular, strength of the weld seam.

SUMMARY OF THE INVENTION

The object of the invention is therefore to provide a flat film complying with the above-mentioned preconditions.

Said object is accomplished by means of a multilayered, biaxially oriented flat film wherein the two weldable surface layers are comprised of at least one copolyamide and at least one amorphous polyamide and/or at least one least one amorphous polyamide and/or at least one homopolyamide and/or at least one modified polyolefin, and which includes at least one additional layer between the two weldable surface layers.

DETAILED DESCRIPTION OF THE PREFERRED EMBODIMENTS

The surface layers are constituted of at least one sealable copolyamide. These per se known copolyamides are produced from monomers selected from the group of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine, and xylylenediamine. The wall thickness of each surface layer is between 5 and 16 μm.

Surprisingly, addition of an amorphous polyamide and/or homopolyamide and/or of a modified polyolefin to a copolyamide in the surface layer significantly increases the seal seam strength compared to pure copolyamide, and high seal seam strength is achieved even at low sealing temperatures. Consequently, the film of the invention presents considerable technological advantages.

Polyamides having a glass transition temperature between 50 and 200° C. in dry state are used as amorphous polyamides for the surface layer. Examples are polyamide 6I/6T, polyamide 6-3-T and polyamide 6I.

Polyamides which can be produced from the same monomers as the copolyamides described above are used as homopolyamides for the surface layer. The homopolyamides can be both aliphatic and partially aromatic in character.

The modified polyolefins are copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon.

The major component of each surface layer is a sealable copolyamide or a mixture of sealable copolyamides, said major component being present in amounts of between 50 and 95 wt.-%. The other components, amorphous polyamide, homopolyamide and modified polyolefin, can be admixed to the major component in amounts of from 0 to 30 wt.-%, relative to the overall surface layer.

At least one additional layer is situated between the two surface layers of the flat film according to the invention. The additional layer or layers arranged between the two surface layers serve to provide the flat film with further desirable properties, in addition to weldability, such as high barrier to oxygen and water vapor, high puncture resistance, or good mechanical properties.

Materials capable of forming the layers between the two surface layers are polyamides, polyolefins, modified polyolefins, and ethylene-vinyl alcohol copolymers. Mixtures of these materials with each other can also be used. Where adjacent layers do not have sufficient adhesion to each other, additional layers of adhesion promotors can be present.

The polyamides as intermediate layer can be homo- and/or copolyamides produced from monomers selected from the group of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine, and xylylenediamine. Preferred homo- and copolyamides are polyamide 6, polyamide 12, polyamide 610, polyamide 612, polyamide MXD6, polyamide 6/66, polyamide 6/12, and polyamide 6I/6T. The wall thickness of the polyamide intermediate layer is between 5 and 30 μm.

The polyolefins as intermediate layer are homopolymers of ethylene or propylene and/or copolymers of linear α-olefins having from 2 to 8 C atoms. Linear low-density polyethylene, high-density polyethylene, polypropylene homopolymer, polypropylene block copolymer and polypropylene random copolymer are preferably used for this layer. The wall thickness of the polyolefin intermediate layer is between 5 and 30 μm.

The modified polyolefins used as intermediate layer are copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon. The wall thickness of the intermediate layer of modified polyolefin is between 5 and 30 μm.

The ethylene-vinyl alcohol copolymers used as intermediate layer are produced by complete saponification of copolymers of ethylene and vinyl acetate. In general, the amount of ethylene in the ethylene-vinyl alcohol copolymers is between 27 and 48 mole-%. For the intermediate layer, ethylene-vinyl alcohol copolymers are preferred, wherein the amount of ethylene is between 34 and 48 mole-%. The wall thickness of the intermediate layer of ethylene-vinyl alcohol copolymer is between 3 and 20 μm.

Where adhesion promoters are used in the intermediate layer, these adhesion promoters are homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon.

Preferred sequences of the single layers in the multilayered flat film of the invention are set forth below, wherein the letters and numbers have the following meanings:
A: Weldable surface layer
B: Polyamide intermediate layer
C: Polyolefin intermediate layer
D: Modified polyolefin intermediate layer
E: Ethylene-vinyl alcohol intermediate layer
F: Adhesion-promoting intermediate layer The numerical indices 1, 2, . . . denote multiple layers from the same class of raw materials.

Three-layered structure:
$A_1BA_2$; $A_1DA_2$; $A_1EA_2$
Four-layered structure:
$A_1BDA_2$; $A_1BEA_2$; $A_1DEA_2$
Five-layered structure:
$A_1F_1CF_2A_2$; $A_1F_1BF_2A_2$; $A_1F_1BEA_2$; $A_1DBEA_2$; $A_1F_1EF_2A_2$; $A_1B_1EB_2A_2$;
Six-layered structure:
$A_1EBFDA_2$; $A_1F_1EBF_2A_2$; $A_1D_1EBD_2A_2$; $A_1F_1CF_2EA_2$; $A_1B_1EDB_2A_2$; $A_1BD_1CD_2A_2$; $A_1D_1CD_2EA_2$; $A_1DB_1EB_2A_2$
Seven-layered structure:
$A_1D_1B_1EB_2D_2A_2$; $A_1FB_1EB_2DA_2$; $A_1EBF_1CF_2A_2$; $A_1F_1EF_2BDA_2$; $A_1F_1EDCF_2A_2$ In addition, conventional auxiliary agents such as antiblocking agents, stabilizers, antistatic agents or lubricants can be included in the flat film. These auxiliary agents are normally added in amounts of from 0.1 to 5 wt.-%. Furthermore, the film can be colored by adding pigments or pigment mixtures.

The flat films according to the invention can be produced according to two per se known methods. Firstly, a primary tube having the desired number of layers can be produced by coextrusion, which primary tube is then subjected to biaxial stretching and heat-setting. Thereafter, the tubular film obtained is cut open along the length thereof to furnish the desired flat film. In the second method, a flat film having the desired number of layers and a greater wall thickness is directly produced by coextrusion and subsequently subjected to biaxial stretching and heat-setting to directly furnish the desired flat film. According to both methods, it is possible to produce broad flat films which are unduly broad to be used for packaging and wrapping foodstuffs. In this case, it is possible to cut the broad flat films along the length thereof to form blanks smaller in width which then can be welded to form tubular films having the desired dimensions.

The tubular films of the invention have an overall wall thickness of from 30 to 100 μm, preferably from 40 to 80 μm.

The weld seam strength of the tubular films according to the invention and of a Comparative Example were determined.

To determine the weld seam strength, strips 50 mm in width were taken from each flat film at a right angle to the machine direction. Two strips at a time were welded together, where firstly, the surface layer 1 was welded on surface layer 2 in overlap (welding method 1) and secondly, the surface layer 1 was welded on surface layer 1 one on top of the other (welding method 2). An SGPE 20 laboratory welding apparatus from W. Kopp Verpackungsmaschinen was used as welding tool. Strips 25 mm in width were taken from the welded samples in such a way that the weld seam was at a right angle to the length of the strip. The strip samples were stretched on a tensile testing machine from Instron Company at a stretching rate of 500 mm/min until breaking of the weld seam occurred. The resulting maximum force will be referred to as weld seam strength hereinafter.

At a sealing temperature of 120° C., the flat films of the invention, welded according to welding method 1, showed a weld seam strength significantly higher than that of the Comparative Example. At sealing temperatures of 180° C. and 200° C., the specimen produced according to welding method 2 achieved significantly improved weld seam strength as compared to the Comparative Example.

The invention well be illustrated in more detail with reference to the following examples.

EXAMPLE 1

Five-Layered Flat Film:

The individual polymers for the separate layers were plastified and homogenized on a tubular film coextrusion plant in five extruders. According to the desired single wall thickness ratios, the five melt streams were fed into a five-layer extrusion head, formed into a primary tube and subjected to biaxial stretching and heat-setting. The primary tube had a diameter of 67.5 mm and a mean overall wall thickness of 0.68 mm. It was heated to 122° C. using infrared radiation and stretched at a surface stretch ratio of 10.4. The biaxially stretched tube was heat-set, flattened, and wound up. The mean overall wall thickness of the tube was 65 μm, and the flat width was 356 mm.

The layers of the final tube consisted of the following polymers, with a single wall thickness as indicated:

| 1st layer (outer layer): | Blend of 90% polyamide 6/12, Grilon CF6S from EMS Chemie and 10% ionomer resin, Surlyn 1652 from Du Pont de Nemours GmbH, | 10 μm |
|---|---|---|
| 2nd layer: | Adhesion promotor, modified polyethylene, | 15 μm |

-continued

| | | |
|---|---|---|
| | Admer NF 478 E from Mitsui Chemicals Inc., | |
| 3rd layer: | Polyamide 6, Durethan B40 F from Bayer AG, | 14 μm |
| 4th layer: | Adhesion promotor (as in layer 2), | 15 μm |
| 5th layer (inner layer): | Blend of 90% polyamide 6/12, Grilon CF6S from EMS Chemie and 10% ionomer resin, Surlyn 1652 from Du Pont de Nemours GmbH, | 10 μm |

The coextruded tubular film was cut open and wound up as a flat film.

The following weld seam strength values were determined:
Welding method 1:
Sealing temperature 120° C.: 181 N/25 mm
Sealing temperature 200° C.: 115 N/25 mm
Welding method 2:
Sealing temperature 180° C.: 93 N/25 mm
Sealing temperature 200° C.: 94 N/25 mm

EXAMPLE 2

Five-Layered Flat Film:

The individual polymers for the separate layers were plastified and homogenized on a tubular film coextrusion plant in five extruders. According to the desired single wall thickness ratios, the five melt streams were fed into a five-layer extrusion head, formed into a primary tube and subjected to biaxial stretching and heat-setting. The primary tube had a diameter of 67.5 mm and a mean overall wall thickness of 0.66 mm. It was heated to 126° C. using infrared radiation and stretched at a surface stretch ratio of 10.1. The biaxially stretched tube was heat-set, flattened, and wound up. The mean overall wall thickness of the tube was 65 μm, and the flat width was 355 mm.

The layers of the final tube consisted of the following polymers, with a single wall thickness as indicated:

| | | |
|---|---|---|
| 1st layer (outer layer): | Blend of 85% polyamide 6/12, Grilon CF6S from EMS Chemie and 5% polyamide 6I/6T, Grivory G21 from EMS Chemie and 10% ionomer resin, Surlyn 1652 from Du Pont de Nemours GmbH, | 10 μm |
| 2nd layer: | Ethylene-vinyl alcohol copolymer, Soarnol AT4406 from Nippon Gohsei, | 6 μm |
| 3rd layer: | Polyamide 6, Durethan B40 F from Bayer AG, | 19 μm |
| 4th layer: | Adhesion promotor, modified polyethylene, Bynel 4140 from Du Pont de Nemours GmbH, | 20 μm |
| 5th layer (inner layer): | Blend of 85% polyamide 6/12, Grilon CF6S from EMS Chemie and 5% polyamide 6I/6T, Grivory G21 from EMS Chemie and 10% ionomer resin, Surlyn 1652 from Du Pont de Nemours GmbH, | 10 μm |

The coextruded tubular film was cut open and wound up as a flat film.

The following weld seam strength values-were determined:
Welding method 1:
Sealing temperature 120° C.: 190 N/25 mm
Sealing temperature 200° C.: 115 N/25 mm
Welding method 2:
Sealing temperature 180° C.: 86 N/25 mm
Sealing temperature 200° C.: 96 N/25 mm

COMPARATIVE EXAMPLE

A five-layered flat film was produced as in Example 1, with the exception that the first and fifth layers consisted of pure polyamide 6/12, Grilon CF6S from EMS Chemie.

The following weld seam strength values were determined:
Welding method 1:
Sealing temperature 120° C.: 167 N/25 mm
Sealing temperature 200° C.: 114 N/25 mm
Welding method 2:
Sealing temperature 180° C.: 78 N/25 mm
Sealing temperature 200° C.: 80 N/25 mm

What is claimed is:

1. A coextruded, multilayered, biaxially, weldable flat film for the production of welded tubular films, wherein both surface layers of the flat film can be welded and are comprised of at least:
    a) one copolyamide and at least
    $b_1$) one amorphous polyamide and/or at least
    $b_2$) one homopolyamide and/or at least
    $b_3$) one modified polyolefin.

2. The flat film according to claim 1, wherein the copolyamides of the surface layers are produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

3. The flat film according to claim 1, wherein the copolyamides in each surface layer are present in amounts ranging from 50 to 95 wt %.

4. The flat film according to claim 1, wherein the surface layers comprise amorphous polyamides having a glass transition temperature ranging from 50 to 200° C. in a dry state.

5. The flat film according to claim 4, wherein the glass transition temperature of the amorphous polyamides ranges from 90 to 160° C.

6. The flat film according to claim 1, wherein the surface layers comprise homopolyamides produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

7. The flat film according to claim 1, wherein the surface layers comprise modified polyolefins, which are copolymers of ethylene or propylene and optionally other linear α-olefins having from 3 to 8 C atoms and at least one α,β-unsaturated carboxylic acid, or graft copolymers of the above mentioned monomers on polyolefins, or partially saponified ethylene-vinyl acetate copolymers which are optionally graft-polymerized with an α,β-unsaturated carboxylic acid and have a low saponification level, or mixtures thereof.

8. The flat film according to claim 1, wherein each of the amorphous polyamide, homopolyamide and modified polyolefin is present in amounts ranging from 0 to 30 wt % relative to the respective surface layer.

9. The flat film according to claim 1, wherein the wall thickness of each layer ranges from 5 to 16 μm.

10. The flat film according to claim 1, wherein at least one additional layer is disposed between the surfaces layers.

11. The flat film according to claim 10, wherein the additional layer or layers disposed between the surfaces layers are comprised of materials or mixtures thereof selected from the group consisting of polyamide, polyolefin, modified polyolefin and ethylene-vinyl copolymers.

12. The flat film according to claim 10, wherein the additional layer disposed between the surface layers is comprised of at least one homopolyamide and/or at least one copolyamide produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

13. The flat film according to claim 12, wherein the wall thickness of the polyamide layer ranges from 5 to 30 μm.

14. The flat film according to claim 10, wherein the additional layer disposed between the surface layers is comprised of homopolymers of ethylene or propylene and/or copolymers of linear α-olefins having from 2 to 8 C atoms.

15. The flat film according to claim 14, wherein the wall thickness of the polyolefin layer ranges from 5 to 30 μm.

16. The flat film according to claim 10, wherein the additional layer disposed between the surface layers is comprised of copolymers of ethylene or propylene and optionally other linear α-olefins having from 3 to 8 C atoms and α,β-unsaturated carboxylic acids selected from the group consisting of acrylic acid, methacrylic acid and/or metal salts and/or alkyl esters thereof, or grail copolymers of the above mentioned monomers on polyolefins, or partially saponified ethylene-vinyl acetate copolymers which are optionally graft-polymerized with an α,β-unsaturated carboxylic acid and have a low saponification level, or mixtures thereof.

17. The flat film according to claim 16, wherein the wall thickness of the modified polyolefin layer ranges from 5 to 30 μm.

18. The flat film according to claim 10, wherein the additional layer comprises an ethylene-vinyl alcohol copolymer disposed between the surface layers, and the amount of ethylene ranges from 27 to 48 mole %.

19. The flat film according to claim 18, wherein the wall thickness of the ethylene-vinyl alcohol copolymer ranges from 3 to 20 μm.

20. The flat film according to claim 1, wherein the surface layers comprise modified homo- or copolymers of ethylene and/or propylene and optionally other linear α-olefins having from 3 to 8 C atoms, and said modified homo- or copolymers further comprise at least one α,β-unsaturated carboxylic acid selected from the group consisting of maleic acid, furnaric acid, itaconic acid and anhydrides, esters, amides or imides thereof grafted thereon.

21. The flat film according to claim 20, wherein the wall thickness of the adhesion-promoting layer ranges from 3 to 20 μm.

22. The flat film according to claim 1, wherein the overall wall thickness ranges from 30 to 100 μm.

23. A multilayered, weldable flat film, produced by coextrusion of a flat film and subsequent biaxial stretching and heat-setting.

24. A multilayered, weldable flat film, produced by coextrusion of a tubular film, with subsequent biaxial stretching and heat-setting, and cutting open of the tubular film to form the flat film.

25. A tubular film comprising the flat film of claim 1.

26. A foodstuff packaging film comprising the tubular film according to claim 25.

27. The flat film according to claim 7, wherein the α,β-unsaturated carboxylic acid is selected from the group consisting of acrylic acid and methacrylic acid and/or metal salts and/or alkyl esters thereof.

28. The flat film according to claim 18, wherein the amount of ethylene ranges from 34 to 48 mole %.

29. The flat film according to claim 1, wherein the overall wall thickness ranges from 30 to 80 μm.

30. A coextruded, multilayered, biaxially, weldable flat film for the production of welded tubular films, wherein both surface layers of the flat film can be welded and are comprised of at least:
 a) one copolyamide and at least
 b$_1$) one amorphous polyamide and/or at least
 b$_2$) one homopolyamide and/or at least
 b$_3$) one modified polyolefin that is a copolymer of ethylene or propylene, optionally at least one other linear α-olefin having from 3 to 8 C atoms and an α,β-unsaturated carboxylic acid, metal salt thereof and/or alkyl ester thereof, or a graft copolymers of the above mentioned monomers on polyolefins, or partially saponified ethylene-vinyl acetate copolymers which are optionally graft-polymerized with an α,β-unsaturated carboxylic acid and have a low saponification level, or mixtures thereof.

* * * * *